US012103006B2

(12) United States Patent
Nelson et al.

(10) Patent No.: US 12,103,006 B2
(45) Date of Patent: Oct. 1, 2024

(54) SELF-METERING OF FLUID INTO A REACTION CHAMBER

(71) Applicant: Tetracore, Inc., Rockville, MD (US)

(72) Inventors: William M. Nelson, Rockville, MD (US); Aymeric Randanne de Vazeille, Leesburg, VA (US); Kyle Armantrout, Los Angeles, CA (US)

(73) Assignee: Tetracore, Inc., Rockville, MD (US)

( * ) Notice: Subject to any disclaimer, the term of this patent is extended or adjusted under 35 U.S.C. 154(b) by 646 days.

(21) Appl. No.: 17/006,363

(22) Filed: Aug. 28, 2020

(65) Prior Publication Data

US 2020/0391214 A1 Dec. 17, 2020

Related U.S. Application Data

(62) Division of application No. 15/255,431, filed on Sep. 2, 2016, now Pat. No. 10,758,908.

(60) Provisional application No. 62/213,666, filed on Sep. 3, 2015.

(51) Int. Cl.
*B01L 7/00* (2006.01)

(52) U.S. Cl.
CPC ......... *B01L 7/52* (2013.01); *B01L 2200/0605* (2013.01); *B01L 2200/0689* (2013.01); *B01L 2200/16* (2013.01); *B01L 2400/0478* (2013.01)

(58) Field of Classification Search
CPC ........................................................ B01L 7/52
See application file for complete search history.

(56) References Cited

U.S. PATENT DOCUMENTS 5,786,182 A 7/1998 Catanzariti et al.
6,660,228 B1 12/2003 Chang et al.
10,758,908 B2 * 9/2020 Nelson ...................... B01L 7/52
2008/0114304 A1 5/2008 Nalesso et al.
2013/0149775 A1 6/2013 Williams et al.
2014/0099646 A1 4/2014 Connolly et al.
2015/0099291 A1 4/2015 Ririe et al.
2017/0065980 A1 * 3/2017 Nelson ...................... B01L 7/52
2020/0391214 A1 * 12/2020 Nelson ...................... B01L 7/52

FOREIGN PATENT DOCUMENTS

EP 1663847 B1 * 11/2016 ............ B01L 3/0265
WO WO2011137039 11/2011

OTHER PUBLICATIONS

23andme Manual (2010), "Providing Saliva Sample For DNA Test Kit" (Year: 2010).
Mariella, "Development of a battery-powered hand-held real-time PCR instrument," Proc. SPIE 4265, Biomedical Instrumentation Based on Micro-and Nanotechnology, May 21, 2001, BIOS 2001 The International Symposium on Biomedical Optics. (vol. 4265, pp. 58-65). (Year: 2001).

* cited by examiner

*Primary Examiner* — Stephanie K Mummert
*Assistant Examiner* — Olayinka A Oyeyemi
(74) *Attorney, Agent, or Firm* — Finnegan, Henderson, Farabow, Garrett & Dunner, LLP

(57) ABSTRACT

A self-metering reaction device has a sample reservoir, configured to accept a varying amount of fluid; a metering reservoir, configured to be a subportion of the sample reservoir and to hold a reaction amount of the fluid; a reaction chamber fluidly connected to the metering reservoir; and a plunger comprising a tip configured to make a seal with the metering reservoir so that the reaction amount of the fluid is sealed within the metering reservoir when the plunger is in contact with the metering reservoir. The plunger can be configured to plunge the sealed reaction amount of the fluid from the metering reservoir into the reaction chamber.

20 Claims, 6 Drawing Sheets

SELF-METERING OF FLUID INTO A REACTION CHAMBER

PRIORITY CLAIM

This application is a divisional of U.S. application Ser. No. 15/255,431, filed Sep. 2, 2016, which claims priority from U.S. Provisional Patent Application No. 62/213,666 filed on Sep. 3, 2015, which is are hereby incorporated by reference in its their entirety in the present application.

FIELD OF THE INVENTION

This disclosure relates to systems and methods for self-metering of a fluid.

BACKGROUND

Devices configured to self-meter fluids are useful in conducting biological or chemical reactions.

U.S. Pat. No. 5,208,163 discloses a self-metering fluid analysis device that includes a housing with various chambers and compartments that process blood. Blood is introduced into a metering chamber, and excess blood is drawn from the metering chamber by a metering capillary, leaving behind a specific, desired amount of blood.

U.S. Pat. No. 5,234,813 discloses a method and device for metering of fluid samples that includes a sample well, a siphon means, and an absorbent pad or capillary network in an assay initiation area. The sample well sits at a level lower than the assay initiation area so that fluid is transported into the assay initiation area only when an adequate amount of fluid is in the sample well. When an adequate amount of fluid is present in the sample well, the fluid comes into contact with the assay initiation area. The fluid is transported via the siphon means to the assay initiation area via the drawing force of the absorption pad or the capillary network in the assay initiation area.

U.S. Patent Application Publication No. 2013/0183768 discloses a self-metering system and testing device that includes a casing and a sliding member. Openings in the casing and the sliding member define a specified volume in which an imprecise amount of sample can be dispensed. The sliding member can be moved transversely to the case opening so that excess sample is removed, and a specific volume of sample remains in the casing opening.

The present disclosure present methods and systems for self-metering fluid not disclosed in the prior art.

SUMMARY

A reaction process sometimes requires specific or precise amounts of reagents in order for the reaction to run correctly. The specificity or precision needed often means that such reaction processes are run in a laboratory environment by trained personnel. For example, specialized equipment such as a pipette are used by personnel who know how to use the equipment to meter out the right amount of fluid and dispense it into a reaction receptacle.

However, there is sometimes a need or desire for the reaction process to be performable in a less controlled environment by an untrained person. For example, some diagnostic tests are performed in the field in order to provide immediate diagnoses or diagnoses in areas remote from technical facilities. As another example, some diagnostic tests are performed by the testing subjects of interest in their homes to facilitate privacy or convenience. Yet another example, employees whose occupational duties are unrelated to running reaction process could run a diagnostic test to screen for unwanted contaminants in the workplace. In cases like these, requiring use of specialized equipment that requires specialized skills is not feasible.

Devices that are configured to self-meter the correct amount of needed fluid can enable ease and flexibility of use, robustness, and/or precision. With a self-metering system, an untrained person does not have to utilize specialized equipment to meter out the correct amount of fluid. Such system can then be used irrespective of whether a technical facility is available and therefore the reactions can be performed in a wider range of settings. Furthermore, the risk of user error can be reduced.

In one aspect of this disclosure, an exemplary embodiment of a self-metering reaction device may comprise a sample reservoir, configured to accept a varying amount of fluid. The device may also comprise a metering reservoir, configured to be a subportion of the sample reservoir and to hold a reaction amount of the fluid. The device may also comprise a reaction chamber fluidly connected to the metering reservoir. The device may comprise a plunger comprising a tip configured to make a seal with the metering reservoir so that the reaction amount of the fluid is sealed within the metering reservoir when the plunger is in contact with the metering reservoir. The device may also comprise a plunger configured to plunge the sealed reaction amount of the fluid from the metering reservoir into the reaction chamber.

In another aspect of this disclosure, an exemplary embodiment of a method of self-metering a fluid into a reaction chamber may comprise dispensing the fluid into a sample reservoir, a subportion of which is a metering reservoir configured to hold a reaction amount of the fluid. The method may also comprise inserting a plunger into the sample reservoir and metering reservoir, the plunger comprising a tip configured to make a seal with the metering reservoir. The method may comprise creating the seal between the metering reservoir and the plunger so that the reaction amount of the fluid is sealed within the metering reservoir when the plunger is in contact with the metering reservoir. The method may also comprise plunging, with the plunger, the sealed reaction amount of the fluid from the metering reservoir into the reaction chamber.

DETAILED DESCRIPTION

Figure 1A:
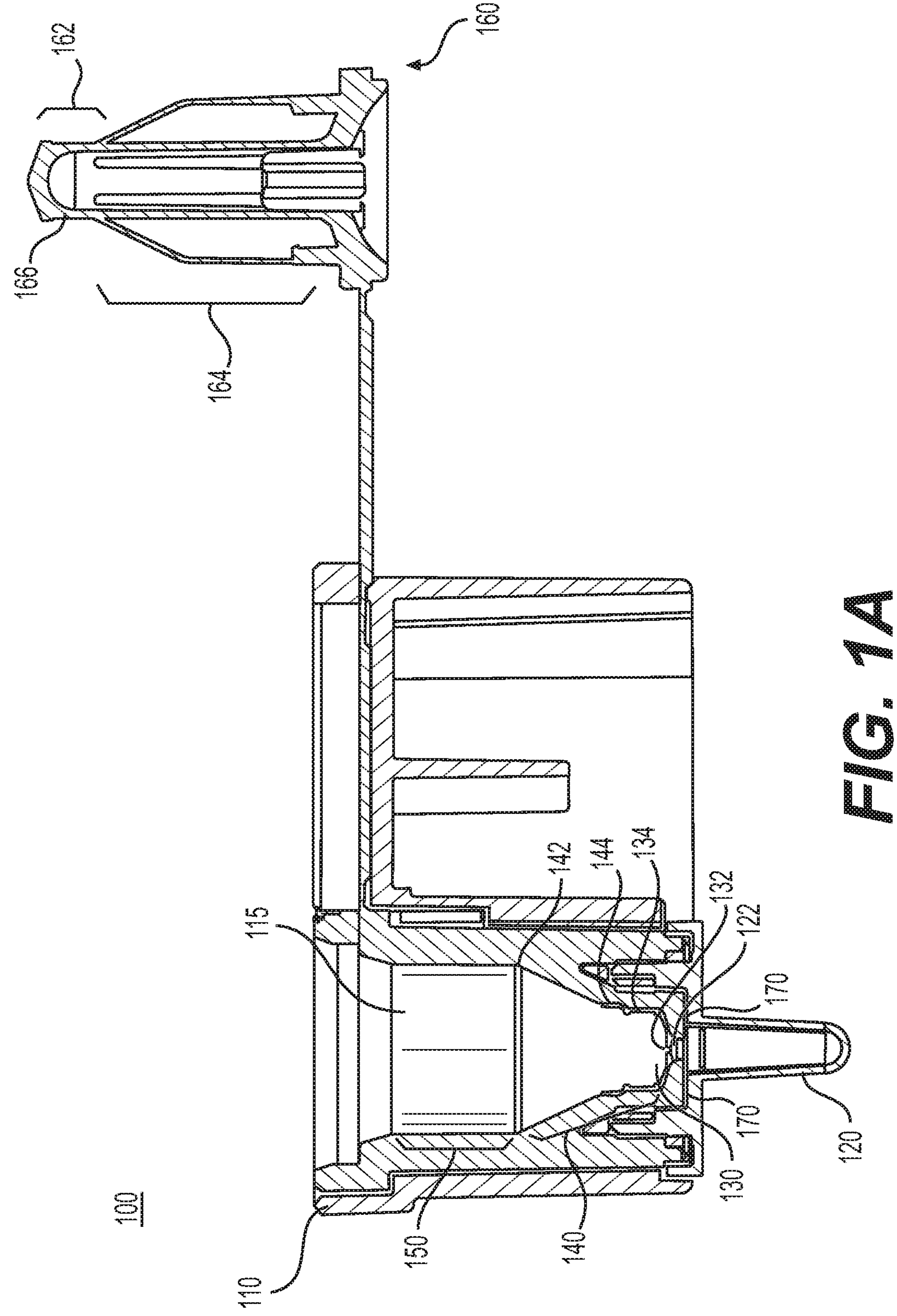
FIG. 1A is an illustration of an exemplary self-metering reaction device.

Reference will now be made to certain embodiments consistent with the present disclosure, examples of which are illustrated in the accompanying drawings.

Reactions, such as chemical or biological reactions, may need specific amounts of fluid (e.g., reagents, sample fluid, etc.) to be metered into a reaction chamber of a reaction device. The amount of fluid in the reaction chamber can affect the success and consistency of the reactions. A user may employ a device that measures the amount of fluid, such as a pipette, to load a correct amount of reactant into a reaction chamber. The pipette draws up a specific volume needed for the reaction, which is then dispensed into a reaction chamber. This disclosure provides methods and systems for self-metered reactions where the fluid that is dispensed into the reaction device does not need to be a specific, pre-metered amount. Other technical advantages are also embodied by the disclosure.

FIG. 1 illustrates an exemplary self-metering reaction device 100 comprising a cartridge 110, which houses a device chamber 115, reaction chamber 120, a metering reservoir 130, a sample reservoir 140, an overflow chamber 150, and a plunger 160. In an exemplary embodiment, self-metering reaction device 100 may be a biological or chemical reaction device. For example, self-metering reaction device 100 may be a nucleic acid amplification reaction device. In an illustrative embodiment, cartridge 110 may also include a battery and a heating element. In illustrative embodiments, the cartridge 110 can include other components that may be used in running a reaction, including dried down reaction components, which in exemplary formulations can include one or more of PCR primers, DNA fragments, RNA fragments, PCR probes, DNA fragments with fluorophores, magnesium chloride, magnesium sulfate, magnesium acetate, Bovine Serum Albumin (BSA), nucleotides, DNTPs, Taq polymerase, polymerases, reverse transcriptase, RNA inhibitors, trehalose and/or a PCR buffer. In an exemplary embodiment, cartridge 110 may be one integrated unit, in which plunger 160 is integrally or removably attached to cartridge 110. In an exemplary embodiment, cartridge 110 may be manually closed, by folding over plunger 160 so that it is inserted into device chamber 115, which may comprise overflow chamber 150, and/or sample reservoir 140. Sample reservoir 140 may comprise a metering reservoir 130. In an exemplary embodiment, cartridge 110 may comprise more than one piece. For example, plunger 160 may be a separate piece that is not attached to cartridge 110. In an exemplary embodiment, the separate plunger 160 may be inserted into device chamber 115 by bringing it down from above cartridge 110. In an exemplary embodiment, plunger 160 may be inserted into cartridge 110 by way of automation or machinery, such as a robotics system, which actuates the folding over of plunger 160 or the bringing down of plunger 160. In an exemplary embodiment, cartridge 110 may be composed of polypropylene, any other plastic, or any combination of suitable materials.

Figure 1B:
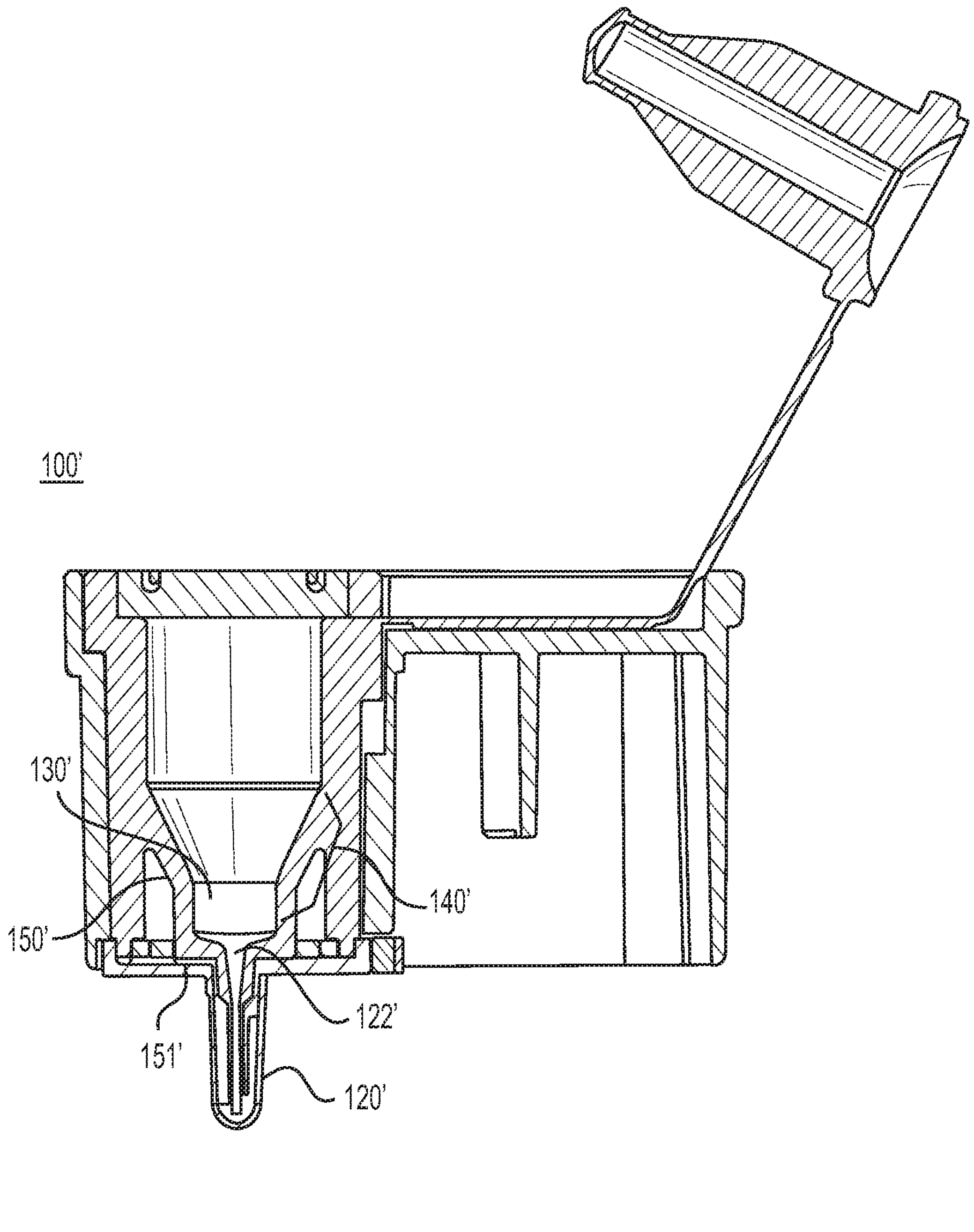
FIG. 1B is an illustration of another exemplary self-metering reaction device.

Reaction chamber 120 may be configured to hold reactants for a reaction. In an exemplary embodiment, the reaction may be a biological or chemical reaction. For example, in an exemplary embodiment, reaction chamber 120 may hold reactants for a nucleic acid amplification reaction. In an exemplary embodiment, reaction chamber 120 may be positioned at the bottom of cartridge 110, as shown in FIG. 1A. Reaction chamber 120 may be positioned at an end of device chamber 115, including overflow chamber 150, sample reservoir 140, and metering reservoir 130. For example, reaction chamber 120 may be adjacent to and fluidically connected to metering reservoir 130. In another exemplary embodiment 100' as shown in FIG. 1B, reaction chamber 120' may be positioned between two components from the group of overflow chamber 150', sample reservoir 140', and metering reservoir 130'. For example, reaction chamber 120' may be interposed between metering reservoir 130' and overflow chamber 150', so that metering reservoir 130' dispenses into reaction chamber 120', which then dispenses into overflow chamber 150', for example by a small fluidic channel 151'.

Reaction chamber 120, in an exemplary embodiment, may be a reaction tube. In an exemplary embodiment, reaction chamber 120 may be an attachable and detachable reaction tube. Reaction chamber 120 may be configured for various functionalities. For example, reaction chamber 120 may be configured to promote a temperature or pressure differential along its length. In an exemplary embodiment, reaction chamber 120 may pressurized. An exemplary range of pressures may be from about 2.5 atm to about 5.5 atm, or in another example from 3.5 atm to about 5.0 atm. Pressurization of reaction chamber 120 may help to prevent condensation during the reaction. Pressurization of reaction chamber 120 may help to prevent a fluid in metering reservoir 130 from dispensing into reaction chamber 120 until plunger 160 has engaged with metering reservoir 130 and provides a plunging force on the fluid. Pressurization can be achieved via compression air by means of the seating of the plunger 160. In addition, the heating of the reaction chamber 120 will serve to pressurize the reaction chamber.

Metering reservoir 130 may be configured to hold a specific amount of fluid to be discharged into reaction chamber 120 as one of the reactants of the reaction. More specifically, metering reservoir 130 may be configured to hold a specific amount of fluid when plunger 160 becomes engaged and creates a seal with metering reservoir 130. The specific amount of fluid held by metering reservoir 130 may be the amount needed to properly run a reaction in reaction chamber 120. Metering reservoir 130 may include two openings, with one opening 132 proximal and connecting to reaction chamber 120 and the other opening 134 being proximal to and connecting to the rest of sample reservoir 140, of which metering reservoir 130 may be a subportion.

In an exemplary embodiment, opening 134 may have a diameter that is large enough so that air is not trapped beneath fluid that is dispensed into metering reservoir 130 by, for example, a user or a dispensing machine. If air is trapped between the fluid in metering reservoir 130 and reaction chamber 120, the amount of fluid contained within metering reservoir 130 when plunger 160 engages with metering reservoir 130 may not be the correct amount needed for the reaction, due to the air displacing a volume of the fluid in metering reservoir 130. In an exemplary embodiment, the fluid can be water or Tris-EDTA (TE) buffer. Where such fluids are used in nucleic acid amplification, the diameter of opening 134 may be at least about 5 mm.

In an exemplary embodiment, opening 132 may have a diameter that is small enough so that, given a surface tension of the fluid being held by metering reservoir 130, the fluid does not dispense into reaction chamber 120 until plunger 160 engages with metering reservoir 130 and provides a plunging force on the fluid. In an exemplary embodiment, it may be the combination of opening 132 being small enough and the pressure in reaction chamber 120 being large enough that prevents the fluid from dispensing into reaction chamber 120 until plunged. In an exemplary embodiment, the fluid can be water or TE buffer. Where such fluids are used, the diameter of opening 132 may be about 1.3 mm in diameter. It is also possible to apply a coating to the pipette or to otherwise modify the surface tension properties of the fluid as desired.

Figure 3:
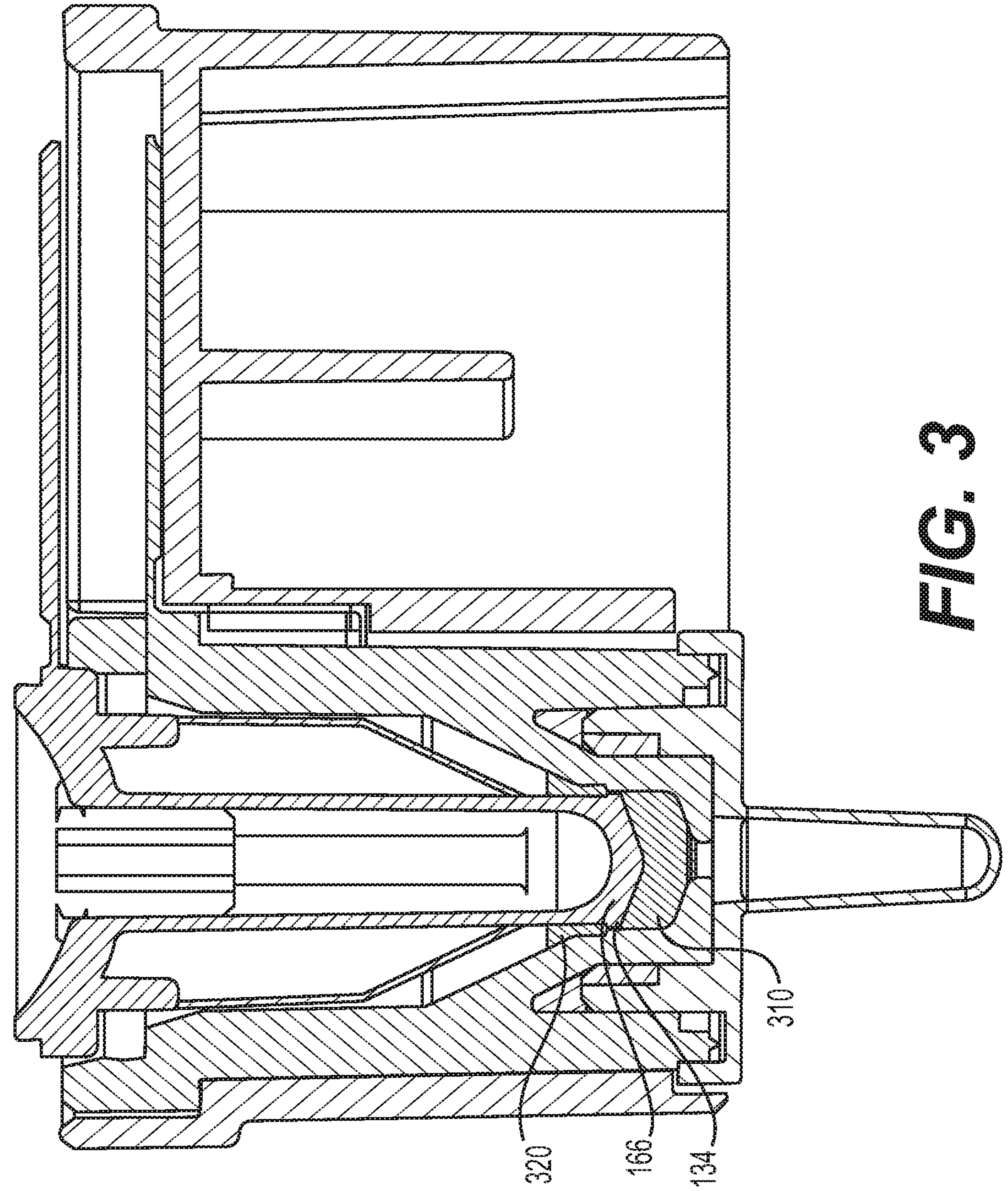
FIG. 3 is an illustration of an exemplary self-metering reaction device, showing a metered amount of fluid sealed in a metering reservoir by a plunger.

Metering reservoir 130 may be a subportion of a larger reservoir, i.e., sample reservoir 140. Metering reservoir 130 may be positioned at an end of sample reservoir 140 that is proximal to an end 122 of a reaction chamber 120, as illustrated in FIG. 1A. When a user or machine dispenses fluid into sample reservoir 140, metering reservoir 130 may fill with the fluid before the rest of sample reservoir 140. Sample reservoir 140 may include an opening 142, which is at an end of sample reservoir 140 distal to metering reservoir 130, and an opening 144, which is situated in the sample reservoir 140 proximal to metering reservoir 130. In an exemplary embodiment, opening 142 may be larger than opening 144, and sample reservoir 140 may taper from opening 142 to opening 144, as illustrated in FIG. 1A. In an exemplary embodiment, there may be intermediate openings and taperings between opening 142 and opening 144, as illustrated in FIG. 1A. In an exemplary embodiment, tapering of sample reservoir 140 permits plunger 160 to be inserted into sample reservoir 140 without a tip 162 of plunger 160 engaging and creating a seal with the walls of sample reservoir 140. Rather, plunger 160 does not engage with the walls of chamber 115 until it is inserted into metering reservoir 130, as illustrated in FIG. 3. When inserted into metering reservoir 130, tip 162 of plunger 160 may engage and form a seal with metering reservoir 130.

With reference back to FIG. 1A, overflow chamber 150, in an exemplary embodiment, may be positioned at opening 142, so that once metering reservoir 130 and sample reservoir 140 are full with fluid, overflow chamber 150 begins to fill with any additional fluid. Overflow chamber 150 may have a diameter equal to or larger than the diameter of opening 142 and a widest part (flare 166) of plunger 160, so that plunger 160 does not engage and create a seal with the walls of overflow chamber 150 when plunger 160 is inserted into overflow chamber 150.

In another exemplary embodiment, overflow chamber 150' may be positioned at an end of reaction chamber 120' distal to an end 122' of reaction chamber 120' that is proximal to and connected with metering reservoir 130', as seen in FIG. 1B. In such exemplary embodiment, overflow chamber 150' may begin to fill with fluid after the reaction chamber is filled, for example via small fluidic channel 151'.

Figure 4:
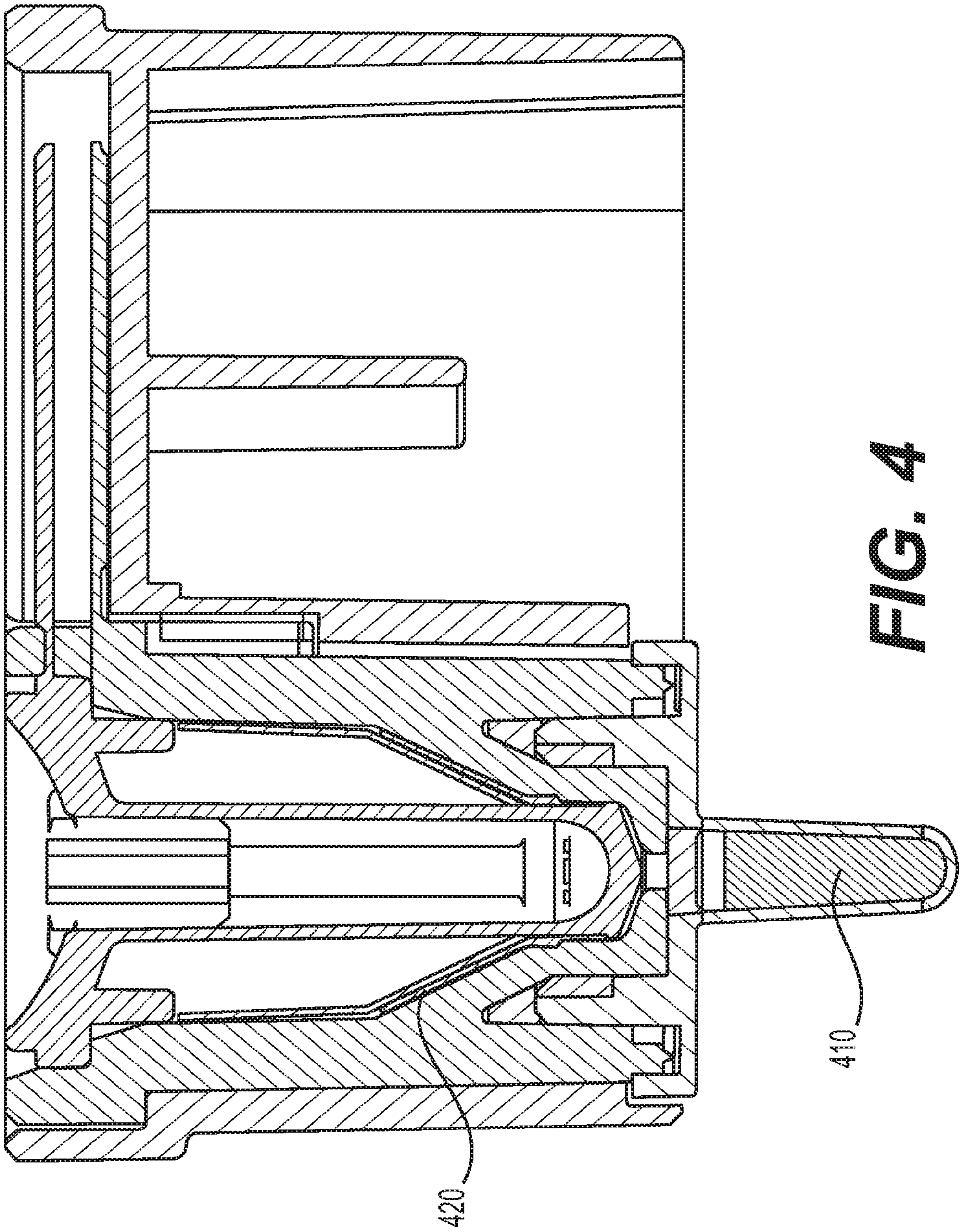
FIG. 4 is an illustration of an exemplary self-metering reaction device, showing metered fluid that has been plunged into a reaction chamber.

Plunger 160 may include a tip 162 and a body 164. Tip 162 may be the narrowest portion of plunger 160. Body 164 may be shaped so that it complements the shape of device chamber 115, as illustrated in FIG. 4. FIG. 4 illustrates self-metering reaction device 100 after plunger 160 has been fully inserted into device chamber 115. Body 164 may be configured to fit within device chamber 115 so that plunger 160 completely plunges the fluid in metering reservoir 130 when fully inserted into cartridge 110. With reference back to FIG. 1A, tip 162 may include a flare 166 so that a largest width of tip 162 is slightly larger than opening 134 of metering reservoir 130. With flare 166 being slightly larger than opening 134, a seal may be created when plunger 160 is inserted into metering reservoir 130 and engages with the walls of metering reservoir 130 as illustrated in FIG. 3. When a seal is formed, metering reservoir 130 may hold a specific reaction amount of fluid, even when more than the specific amount of fluid was present in sample reservoir 140 prior to formation of the seal. As plunger 160 is inserted further into metering reservoir 130, the specific amount of fluid may be plunged through opening 132 into reaction chamber 120. In an exemplary embodiment, as plunger 160 is inserted into metering reservoir 130 and seals off the specific amount of fluid in metering reservoir 130, excess fluid in sample reservoir 140 may be displaced by plunger 160 away from metering reservoir 130 and, if enough excess fluid is present, into overflow chamber 150. In another exemplary embodiment, tip 162 of plunger 160 may include an O-ring that is configured to create the seal with metering reservoir 130. In an exemplary embodiment, tip 162 of plunger 160 may be composed of plastic, rubber, and/or a combination of any materials that allows a seal to be formed via the flared shape of tip 162, an O-ring, and/or any other suitable seal-forming component.

In another exemplary embodiment, flare 166 is not present. Tip 162 of plunger 160 may make a seal with opening 134 by selecting appropriate diameters and tapering the outer diameter of 162, tapering the inner diameter of 130, or tapering both the outer diameter of 162 and the inner diameter 130. In some cases a seal may be made between tip 162 of plunger 160 and opening 134 by selecting appropriate diameters and without tapering the outer diameter of 162 or the inner diameter 130.

In another exemplary embodiment, as shown in FIG. 1B, the fluid flows through the reaction chamber 120' and some moves beyond to the overflow chamber 150'.

Figure 5:
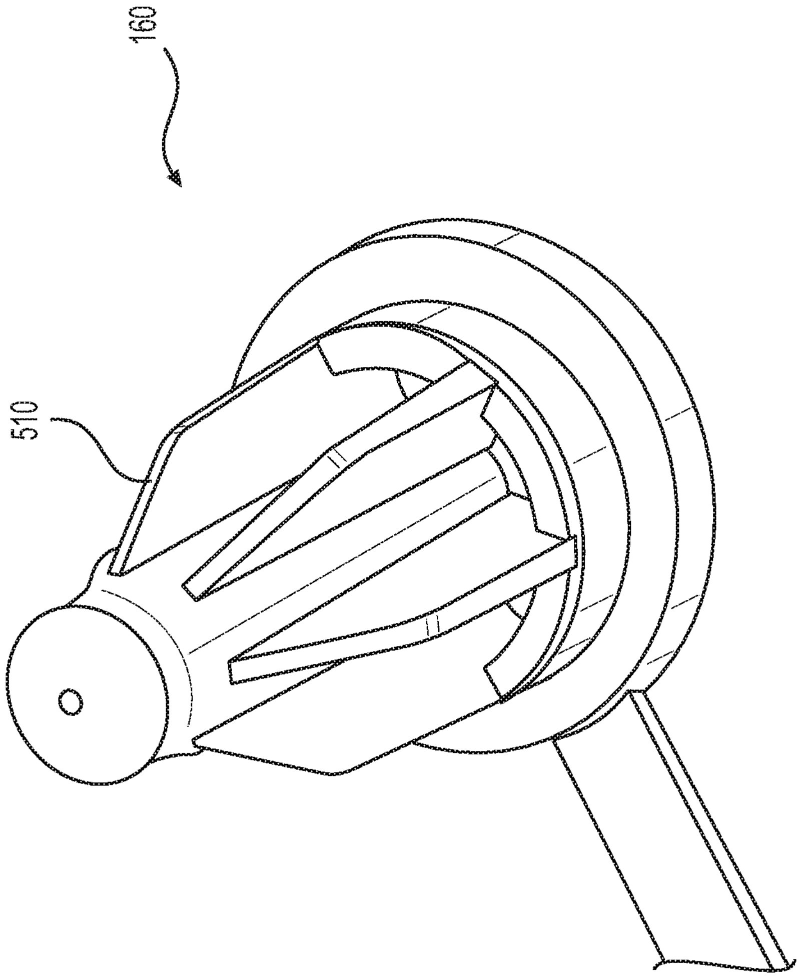
FIG. 5 is an illustration of an exemplary plunger for an exemplary self-metering reaction device.

In an exemplary embodiment, to facilitate the flow of excess fluid into overflow chamber 150 when plunger 160 plunges fluid from metering reservoir 130 into reaction chamber 120, plunger 160 may include structure that defines channels. For example, plunger 160 may include fins 510 as illustrated in FIG. 5. Fins 510 may be positioned along the length of plunger 160 so that excess fluid can be displaced within the space in between fins 510. In another example, plunger 160 may include grooves along the length of plunger 160 that allows excess fluid to be displaced along plunger 160. In an exemplary embodiment, plunger 160 may include other structures that perform the same function of allowing fluid to be displaced along the length of plunger 160.

One exemplary embodiment of self-metering reaction device 100, configured according to FIG. 1A, may have the following dimensions when configured to self-meter 40 μL of fluid from the sealed metering reservoir 130 into reaction chamber 120. In an illustrative embodiment, metering reservoir 130 may be configured to hold a volume of about 40 μl. Opening 134 in an exemplary embodiment has a diameter of about 5 mm, and opening 132 has a diameter of about 1.3 mm. Sample reservoir 140 may be configured to hold an adequate volume, with opening 142 having a diameter of about 10.5 mm. Overflow chamber 150 may be configured to hold a volume of more than 550 μl in an exemplary embodiment. The width of flare 166 of plunger 160 may have a diameter that is greater than about 5 mm, such that the width of flare 166 is slightly larger than opening 134 thereby creating a seal with metering reservoir 130 when it engages with metering reservoir 130.

Self-metering reaction device 100 can be configured to self-meter amounts other than the exemplary amount of 40 μL. Dimensions of metering reservoir 130, sample reservoir 140, overflow chamber 150, and plunger 160 may be selected so that device 100 is configured to dispense a specific or desired amount of self-metered fluid. In the embodiment of device 100', by further example, can be configured to plunge 61 μl of sample from a 66 μl reservoir.

An exemplary method of self-metering of fluid by self-metering reaction device 100 will now be described. In describing the exemplary method, it will be assumed that a user is manually operating device 100 shown in FIG. 1A. However, it should be understood that an automated, semi-automated, or manually operated machine could also operate device 100 or device 100' in a similar manner.

Figure 2:
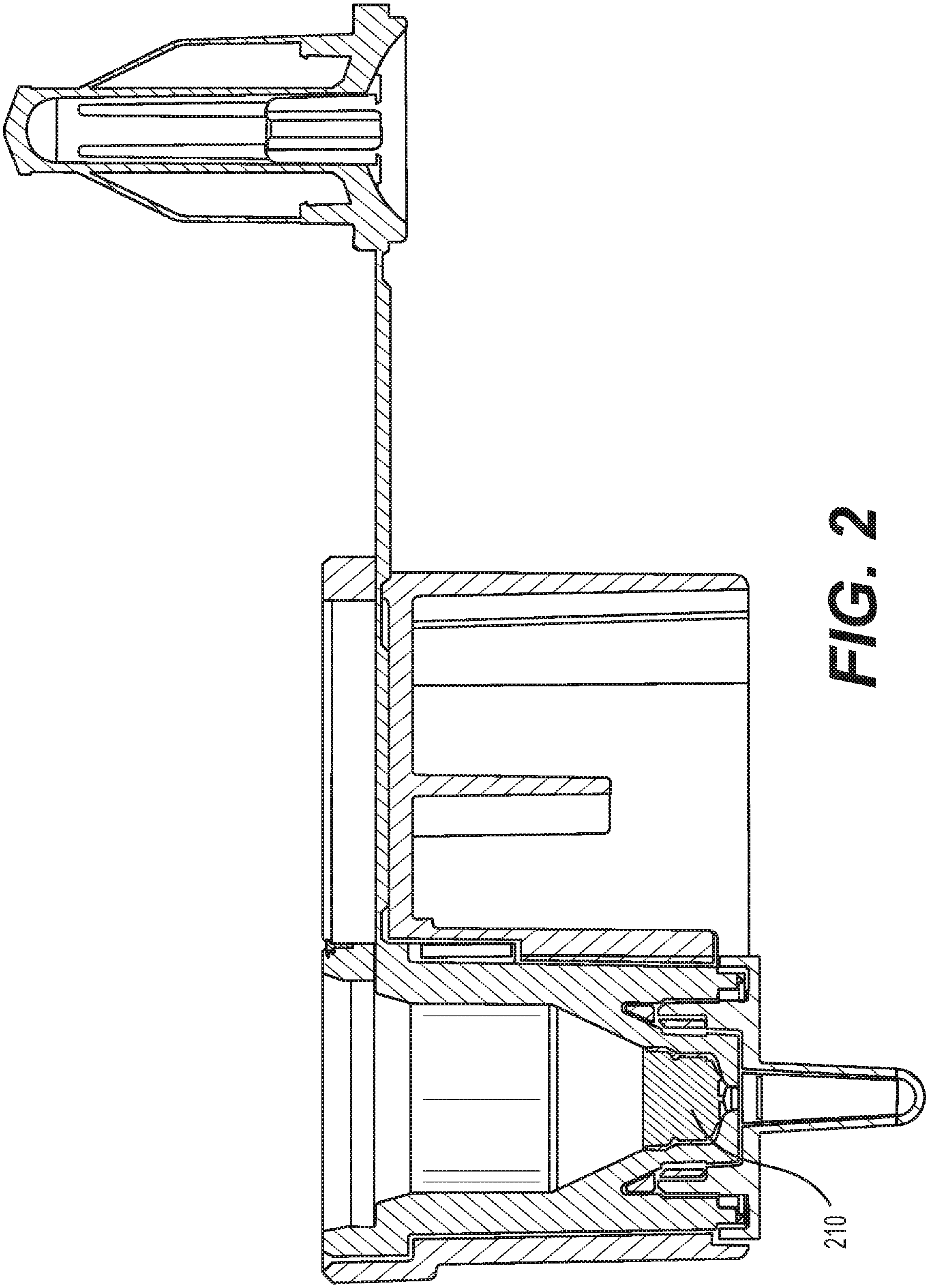
FIG. 2 is an illustration of an exemplary self-metering reaction device, showing the device holding an amount of fluid.

A user may dispense an initial amount of fluid 210 (fluid indicated by crosshatching) into sample reservoir 140 as illustrated in FIG. 2. The initial amount may be an arbitrary amount that the user does not measure out. The initial amount may be more than the volume of metering reservoir 130 but less than the total volume that can be contained in sample reservoir 140 and overflow chamber 150. In an exemplary embodiment, where metering reservoir 130 is configured to dispense 40 μL into reaction chamber 120, and overflow chamber is configured to hold 550 μL, the arbitrary initial amount of fluid 210 may be between 40 μL and 550 μL. The user might, for example, dispense the initial amount of fluid 210 into sample reservoir 140 by eyeing the amount being dispensed in or by using a simple dispenser, for example, an eyedropper.

Once fluid 210 has been dispensed in sample reservoir 140, the user may close cartridge 110 by folding over plunger 160 and inserting plunger 160 into overflow chamber 150, further into sample reservoir 140, and then further into metering reservoir 130. When plunger 160, and more specifically flare 166, engages opening 134 of metering reservoir 130, as illustrated in FIG. 3, a seal may be formed so that sealed fluid 310 contained in metering reservoir 130 cannot flow into the remaining portion of sample reservoir 140. Conversely, unsealed fluid 320 in the remaining portion of sample reservoir 140 cannot flow into metering reservoir 130 once the seal is formed. The user may continue to insert 160 into metering reservoir 130 past the point where the seal is formed so that sealed fluid 310 is plunged through opening 132 of metering reservoir 130 into reaction chamber 120, as illustrated in FIG. 4. In an exemplary embodiment, the amount of plunged fluid 410 in reaction chamber 120 may be the amount of sealed fluid 310 that had been metered in metering reservoir 130. The remaining unplunged fluid 420 may be displaced by plunger 160 into sample reservoir 140 and overflow chamber 150 as illustrated in FIG. 4. The displacement of unplunged fluid 420 may occur between fins 510 of plunger 160, for example. In an exemplary embodiment, because the amount of plunged fluid 410 has been metered by the creation of a seal between plunger 160 and metering reservoir 130, the reaction that subsequently occurs in reaction chamber 120 with plunged fluid 410 can successfully occur.

A seal may be made at location 170, as illustrated in FIG. 1A. A seal at location 170 may improve the consistency of fluid volume delivered to reaction chamber 120 by preventing any fluid volume from entering into location 170. In an exemplary embodiment, an O-ring may be compressed at 170. In an exemplary embodiment, a gasket may be compressed at 170.

Table 1 presents data from a set of experiments that indicate the self-metering capability of an exemplary self-metering reaction device 100, where device 100 is a nucleic acid amplification reaction device that runs polymerase chain reactions (PCRs). Table 1 shows a comparison of the cycle threshold (CT) results for an embodiment of the present disclosure (C2T CARTRIDGE) against the CT thresholds for a conventional capped tube PCR device. The PCR results of self-metering reaction device 100 are closely consistent with the PCR results of a typical non-self-metering device that, for example, requires precise pipetting of the reactant into the reaction chamber.

TABLE 1

| C2T Cartridge vs. Capped C2T Tube | |
|---|---|
| C2T Cartridge | Capped C2T Tube |
| 20.9 | 19.5 |
| 21 | 19.4 |
| 20.1 | 19.6 |
| 21.5 | 19.8 |
| 20.5 | 19.7 |
| 21.3 | 19.6 |
| 21.1 | 19.6 |
| 20.3 | 19.4 |
| 32.3 | 31.5 |
| 33.3 | 31.5 |
| 32.8 | 31.6 |
| 32.6 | 31.7 |
| 32.1 | 31.6 |
| 32.2 | 31.7 |
| 32.7 | 31.3 |
| 32.9 | 31.7 |
| 32.4 | 31.7 |
| 33.3 | 31.5 |
| 32.9 | 31.7 |
| 32.5 | 31.6 |
| 31.3 | 31.6 |
| 31.7 | 31.4 |
| 31.8 | 31.9 |
| 31.4 | 31.6 |
| 31 | 31.6 |
| 31.5 | 31.4 |
| 31.5 | 31.6 |
| 31.6 | 31.4 |

Table 2 presents data from another set of experiments that indicate the self-metering capability of an exemplary self-metering reaction device 100, where device 100 is a nucleic acid amplification reaction device that runs polymerase chain reactions (PCRs). Table 2 shows a comparison of the cycle threshold (CT) results for an embodiment of the present disclosure (C2T CARTRIDGE) against the CT thresholds for a conventional capped tube PCR tube. The PCR results of self-metering reaction device 100 are closely consistent with the PCR results of a typical non-self-metering device that, for example, requires precise pipetting of the reactant into the reaction chamber.

TABLE 2

| C2T Cartridge vs. T-COR 8 Tube | |
|---|---|
| C2T Cartridge | T-COR 8 Tube |
| 20.9 | 21 |
| 21 | 21 |
| 21 | 21.1 |
| 21 | 21 |
| 21 | 21.2 |
| 21 | 21.2 |
| 21 | 21.2 |
| 21.1 | 21.2 |
| 21 | 21.1 |
| 21 | 21 |
| 20.9 | 21.1 |
| 20.6 | 21.1 |
| 21.1 | 21.1 |
| 20.9 | 21.1 |
| 20.8 | 21.2 |
| 20.9 | 21.2 |
| 20.9 | 20.9 |
| 21.1 | 20.9 |
| 21.1 | 20.9 |
| 21 | 21.1 |
| 20.9 | 20.9 |
| 22.1 | 20.9 |
| 20.9 | 20.9 |
| 20.6 | 20.9 |

TABLE 2-continued

| C2T Cartridge vs. T-COR 8 Tube | |
|---|---|
| C2T Cartridge | T-COR 8 Tube |
| 21.1 | 20.9 |
| 20.9 | 21 |
| 21 | 21 |
| 20.8 | 20.9 |
| 20.7 | 20.9 |
| 21 | 21 |
| 21 | 21 |
| 20.8 | 20.9 |

It will be apparent to those skilled in the art that various modifications and variations can be made to the disclosed systems and methods of self-metered reactions. Other embodiments will be apparent to those skilled in the art from consideration of the specification. For example, cartridge 110, reaction chamber 120, metering reservoir 130, sample reservoir 140, overflow chamber 150, and plunger 160, and their connections, can be configured to be of various shapes and sizes and materials, not limited to those described in the specification and illustrated in the drawings. In addition, the method of self-metering using plunger 160, overflow chamber 150, sample reservoir 140, metering reservoir 130, and/or reaction chamber 120 may be applicable to uses beyond that of biological reactions, chemical reactions, or nucleic acid amplification reactions. It is to be understood that various elements and embodiments of the systems and methods disclosed may be combined in ways not discussed to achieve the same or similar technological results, as will be apparent to those skilled in the art. It is intended that the specification and examples be considered as exemplary only, with true scope being indicated by the claims and their equivalents.

What is claimed is:

1. A method of self-metering a fluid into a reaction chamber of a self-metering reaction device, wherein the self-metering reaction device comprises a sample reservoir, a reaction chamber and a plunger, the method comprising:

dispensing the fluid into the sample reservoir, a subportion of the sample reservoir being a metering reservoir, the metering reservoir being configured to be fluidly connected to the reaction chamber and to hold a reaction amount of the fluid;

folding over the plunger, thereby inserting the plunger into the sample reservoir and metering reservoir, the plunger comprising a tip configured to make a seal with the metering reservoir;

engaging the tip of the plunger with the metering reservoir, thereby creating the seal between the metering reservoir and the plunger so that the reaction amount of the fluid is sealed within the metering reservoir; and plunging, with the plunger, the sealed reaction amount of the fluid from the metering reservoir into the reaction chamber, wherein the reaction chamber and plunger are configured so that the reaction chamber can be manually closed by folding over the plunger.

2. The method of claim 1, wherein the reaction chamber is configured for nucleic acid amplification.

3. The method of claim 1, further comprising the step of heating the reaction chamber.

4. The method of claim 1, further comprising providing dried down reaction components in the reaction chamber.

5. The method of claim 4, wherein at least one of the dried down reaction components is selected from the group consisting of: PCR primers, DNA fragments, RNA fragments, PCR probes, DNA fragments with fluorophores, magnesium chloride, magnesium sulfate, magnesium acetate, Bovine Serum Albumin (BSA), nucleotides, DNTPs, Taq polymerase, polymerases, reverse transcriptase, RNA inhibitors, trehalose and a PCR buffer.

6. The method of claim 1, further comprising pressurizing the reaction chamber.

7. The method of claim 6, wherein the reaction chamber is pressurized to a pressure from about 2.5 atm to about 5.5 atm.

8. The method of claim 7, wherein the reaction chamber is pressurized to a pressure from about 3.5 atm to about 5.0 atm.

9. The method of claim 1, further comprising holding a fluid in the metering chamber by surface tension, and subsequently dispensing the fluid into the reaction chamber with a plunging force provided by the plunger on the fluid.

10. The method of claim 1, further comprising overfilling the reaction chamber past a predetermined filling level and subsequently supplying overfilled fluid from the reaction chamber to an overflow chamber.

11. The method of claim 1, wherein the metering chamber is sized to dispense about 40 µl into the reaction chamber.

12. The method of claim 10, wherein the overflow chamber is connected to the reaction chamber via a fluidic channel.

13. The method of claim 10, wherein the overflow chamber begins to fill when the reaction chamber has reached a predetermined filling level.

14. The method of claim 10, wherein the overflow chamber is sized to hold about 550 µl.

15. The method of claim 1, wherein dispensing the fluid into a sample reservoir does not comprise measuring the fluid prior to the dispensing.

16. The method of claim 1, wherein dispensing the fluid into a sample reservoir comprises dispensing an arbitrary amount.

17. The method of claim 16, wherein the arbitrary amount is between about 40 µl and about 550 µl.

18. The method of claim 1, wherein the reaction chamber is an attachable and detachable reaction tube.

19. The method of claim 1, wherein the reaction chamber is configured to promote a temperature differential along its length.

20. The method of claim 1, wherein the metering reservoir comprises at least one opening proximal and connecting to the reaction chamber, wherein the opening has a diameter small enough so that surface tension of the fluid causes the fluid to not dispense from the metering reservoir into the reaction chamber until plunging, with the plunger, the sealed reaction amount of the fluid from the metering reservoir into the reaction chamber.

* * * * *